United States Patent [19]

Waldmeier

[11] 4,398,068
[45] Aug. 9, 1983

[54] CONDUCTOR STRIP AND HOUSING THEREFOR FOR A CURRENT CONDUCTOR RAIL

[76] Inventor: Hugues E. Waldmeier, 30 Rue d'Ottmarsheim, 68170 Rixheim, France

[21] Appl. No.: 264,190

[22] Filed: May 15, 1981

[30] Foreign Application Priority Data

May 20, 1980 [CH] Switzerland ............... 3904/80

[51] Int. Cl.³ ............................................. B60M 1/00
[52] U.S. Cl. .................................. 191/23 A; 191/30; 339/215 R; 339/22 T
[58] Field of Search ................ 339/215, 22 T; 191/23 R, 23 A, 30, 35

[56] References Cited

U.S. PATENT DOCUMENTS 3,172,511  3/1965  Hollander ............... 191/23 A
3,439,132  4/1969  Weber ...................... 191/35
3,609,254  9/1971  Caldwell .
4,016,961  4/1977  Howell, Jr. .
4,050,555  9/1977  Ross ........................ 191/23 A
4,300,666  11/1981  Taniguchi ............... 191/23 A

FOREIGN PATENT DOCUMENTS 1384789  2/1975  United Kingdom .

Primary Examiner—Richard A. Schacher
Attorney, Agent, or Firm—McGlew and Tuttle

[57] ABSTRACT

There is disclosed a metallic conductor strip of approximately Z-shaped cross-section which serves as current conductor in a housing. The strip in cross-section has a limb with a flat contact surface and a limb with an inwardly curved contact surface. The strip is retained in the housing, with which it forms a current conductor rail, by two ribs protruding into an interior space of the housing and by two outwardly bent edge portions of the strip which are engaged in corresponding grooves in the housing. The possibility exists of including a copper conductor member in the housing to cope with higher current intensities.

8 Claims, 4 Drawing Figures

… … …

CONDUCTOR STRIP AND HOUSING THEREFOR FOR A CURRENT CONDUCTOR RAIL

BACKGROUND OF THE INVENTION

The present invention relates to a conductor strip, a housing for the strip, and a current conductor rail composed of the strip and housing.

For current supply to mobile current-consuming equipment, for example, railway engines or trolley cranes, current conductor rails are used, which usually consist of a profiled metallic strip held in a downwardly open housing of insulating material. Known conductor rails of this kind have a number of disadvantages, one of which is that different cross-sectional dimensions are needed for each current path. This increases the size and amount of capital tied up in the inventories of manufacturers of such equipment and components suppliers, and the cost of the equipment becomes correspondingly more expensive.

OBJECTS OF THE INVENTION

The present invention has as its principal object the provision of a current conducting system, in particular a conductor strip, an insulating housing for the strip, and a conductor rail formed from the housing and strip, which system has a relatively simple and economic construction, has a wear-resistant design so as to promote a long service life, and in which minimum cost and complication is associated with the storage and inventory of the system components.

A further and related object of the invention is the provision of a current conducting system, of the kind described, to having system components while can be quickly and, conveniently assembled and in particular, can be assembled in such a manner that a measure of adaptation to differing demands in the mode of co-operation with current pick-up devices is possible.

Other objects and advantages of the invention will be apparent from the following description.

SUMMARY OF THE INVENTION

According to a first aspect of the present invention there is provided a conductor strip of metallic material for insertion into a downwardly open housing of electrically insulating material to form a current conductor rail. In the strip according to the present invention, however, the cross-section is substantially Z-shaped and the external surfaces of at least one of the two transverse limbs at the upper and lower extremities of the cross-section is slightly inwardly curved. This latter feature ensures that a co-operating current pick-up will move primarily in the central region of the curved limb, which has the important advantage from the viewpoint of service life that the pick-up is kept away from the lateral edges of the limb where wear of the pick-up would be much more rapid due to rubbing contact with the constituent material of the housing.

It is particularly advantageous if a respective web portion adjoins each end of each of the limbs of the strip, each of the web portions extending at a right angle to the associated one of the limbs and in direction towards the other limb. Thus, to connect the conductor strips of mutually abutting conductor rails, it may be possible to use simple, rectangular section metal rods which can be inserted into spaces bounded in part by these web portions.

According to a second aspect of the present invention there is provided a downwardly open housing of electrically insulating material defining an interior space of substantially rectangular cross-section for reception of a conductor strip as described above. The cross-section of the interior space is higher than that of the conductor strip, and present at each of the vertical surfaces of the interior space is a respective support rib protruding into the interior space, a respective first recess adjoining each rib and serving for reception of outwardly angled longitudinal edge portions of the conductor strip, and a respective second recess arranged directly adjacent to the portion of the interior space occupied by the conductor strip.

According to a third aspect of the present invention there is provided an electric current conductor rail comprising a conductor strip as defined above, and a downwardly open housing of electrically insulating material defining an interior space of substantially rectangular cross-section receiving the conductor strip, the interior space having a greater cross-sectional height than that of the conductor strip and the housing further defining retaining means retaining the strip in the interior space.

BRIEF DESCRIPTION OF THE DRAWINGS

An embodiment of the present invention will now be more particularly described by way of example and with reference to the accompanying drawings, in which.

DESCRIPTION OF THE PREFERRED EMBODIMENT

Figure 1:
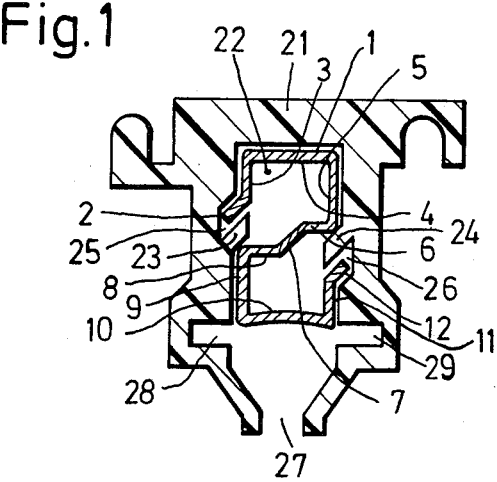
FIG. 1 is a cross-section of a housing with a conductor strip inserted therein in a first mode to define a current conductor rail.

Referring now to the drawings, there is shown a conductor strip 1, preferably consisting of steel, having a centrally symmetrical, substantially Z-shaped cross-section, wherein the two limbs bounding the cross-sectional height of the strip are designated by 4 and 10. Whereas the limb 4 is planar, the limb 10 is slightly inwardly bowed. Adjoining each end of each of the limbs 4 and 10 is a respective one of four webs 3, 5, 9 and 11, the webs substantially bounding the cross-sectional width of the strip and each forming a right angle with the respective adjoining one of the limbs 4 and 10. The web 5 is connected with the diagonally opposite web 9 by a doubly bent connecting web, which is connected at right angles to the two limbs 5 and 9 and which comprises two mutually offset end portions 6 and 8 and an intermediate connecting portion 7. Each of the other two diagonally opposite webs 3 and 11 has a respective, outwardly bent free end portion 2 or 12.

A downwardly open housing 21 of electrically insulating material, for example plastics material, serves in conjunction with the conductor strip 1 for the formation of an electric current conductor rail. The housing 21 defines a substantially rectangular section interior space 22 for the reception of the strip 1, the height of this space, however, being greater than that of the strip. Two support ribs 23 and 24, which project into the interior space, are provided one on each of the two vertical surfaces of the interior space. Adjoining the ribs 23 and 24 are two grooves 25 and 26, respectively, serving for reception of the free end portions 2 and 12, respectively, of the strip 1. As can be seen from FIG. 1, the strip 1 is retained in the housing 21 by means of the ribs 23 and 24 and grooves 25 and 26 and forms a current conductor rail therewith. The steel conductor strip can serve for conduction of current intensities up to 100 amperes.

Figure 2:
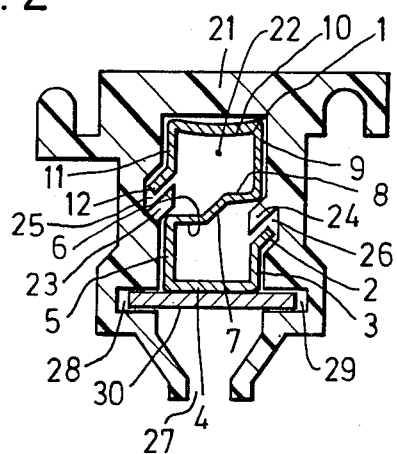
FIG. 2 is a view similar to FIG. 1 but with the conductor strip inserted therein in a second mode, and an additional current conductor also inserted to the housing.

A current pick-up can enter through an opening 27 in the housing 21 below the conductor strip 1 and slide on the inwardly bowed external surface of the limb 10. For higher current intensities, the arrangement shown in FIG. 2 can be employed. This differs from the aforedescribed arrangement of FIG. 1 in that the conductor strip 1 is reversed, i.e. inserted into the housing turned through 180° about its longitudinal axis, this being readily possible in view of the Z-shape symmetrical construction of the strip which is rotatably symmetrical in a 180-degree rotation and the correspondingly shaped interior space of the housing 21. In this case, because of the higher current intensity, the conductor strip 1 no longer provides the contact surface for the pick-up, this surface instead being provided by a supplementary copper current conductor tape member 30. The member 30 is disposed below the strip 1 and its longitudinal edge portions are each engaged in a respective one of two grooves 28 and 29, which are arranged directly below the receiving space, determined by the ribs 23 and 24 and the grooves 25 and 26, for the strip 1.

As will be apparent from the foregoing, only a few components are necessary for the assembly of a current rail, namely a steel conductor strip and a housing of insulating material. Both the strip and housing can be advantageously stored in lengths of, for example, 4 meters, the conductor strip being slightly longer so that length sections thereof can be connected together in the manner subsequently described with reference to FIGS. 3 and 4. For the assembly of a current rail to accept a current loading of more than 100 amperes, the tape member 30 is additionally required and for this purpose a copper tape can be stored in rolls and, after the assembly of the rail, inserted onto the rail over its entire length.

Figures 3, 4:
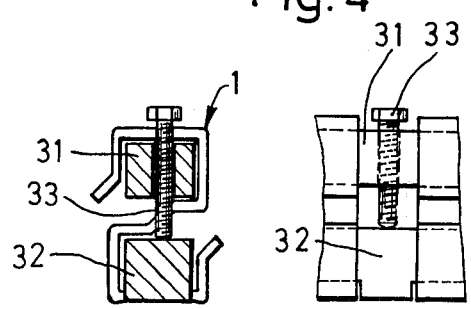
FIG. 3 is an end view of the conductor strip of FIG. 1 in the region of a point of connection to another such strip, connecting means at the point of connection being shown in cross-section.
FIG. 4 is a side view of part of the connection means and the first-mentioned and further conductor strips connected by such connection means.

As can be seen from FIGS. 3 and 4, detachable interconnection of two conductor strips 1 can be effected in a simple manner by two rectangular section connecting elements 31 and 32 and a clamping screw 33. The cross-sectional dimensions of the two connecting elements 31 and 32 are only slightly smaller than those of the general rectangular section spaces partially bounded by the limb 4 and webs 3, 5 and 6 on the one hand and the limb 10 and webs 8, 9 and 11 on the other hand, so that the connecting elements can be inserted into these spaces in two neighbouring strips. The connecting element 31 has a threaded bore for threaded engagement therein of the screw 33, the free end of which bears against the connecting element 32 and thus presses the two connecting elements away from each other and against the limbs 4 and 10 so as to provide a firm but detachable connection of the strips. The connecting element 32 is provided in the center of its underside with an enlarged portion which corresponds in thickness to the depth of the limb 4 so as to form a stepless horizontal sliding surface for the current pick-up. The provision of a firm, but detachable connection of the housings of mutually abutting sections of a current conductor rail thus formed is subject of the simultaneously filed Swiss patent application No. 3905/80 and corresponding United States patent application, while the outer shape of the housing is the subject of the simultaneously filed Swiss patent application No. 3941/80 and corresponding United States patent application.

I claim:

1. A conductor rail arrangement comprising a housing made of an insulating material, said housing having a downwardly extending opening, and a conductor comprising an elongated sectional bar extending within said housing and having a cross-section which is rotatably symmetrical in a 180-degree rotation about the horizontal axis of the elongated sectional bar, said housing having wall means defining grooves on opposite sides of said housing, a strip-shaped conductor mounted in said grooves on both sides of the downward opening to increase the current carrying capacity, said strip-shaped conductor having a surface remote from the opening of bearing against said sectional bar only for low-amperage currents and a surface on its side facing the opening adapted to be contacted by a current collector.

2. A conductor rail arrangement according to claim 1, wherein said sectional bar has a surface area against which the strip-shaped conductor bears, said surface area of said sectional bar being planar and having a width at least one half the width of the strip-shaped conductor.

3. A conductor strip of metallic material for insertion into a downwardly open housing of electrically insulating material to form therewith an electric current conductor rail, wherein the conductor strip comprises a cross-section being approximately Z-shaped, said Z-shaped cross-section having transverse limbs at the upper and lower extremities, and at least one of said transverse limbs at the upper and lower extremities of said cross-section having an external surface being inwardly curved, a respective web portion adjoining each end of each of said limbs, each of said web portions extending at a right angle to the associated one of said limbs and in direction toward the other of said limbs, said strips comprising a connecting web, two diagonally opposite ones of said web portions connected together by said connecting web, said connecting web comprising two end portions which are offset relative to each other and which are each connected at right angles to a respective one of said two diagonally opposite web portions, and an intermediate portion connecting said end portions together, each of the other two diagonally opposite ones of said web portions comprising a free end portion angled to extend outwardly away from the rest of the strip, the housing defining an interior hollow space of substantially rectangular cross-section for reception of said conductor strip, said interior space having a greater cross-sectional height than that of said conductor strip, a respective support rib protruding into said interior hollow space from each vertical side thereof, a respective first recess adjoining each said support rib to receive a respective one of said outwardly angled free end portions of said conductor strip web portions, and a respective second recess arranged at each of said vertical sides directly adjacent the portion of said interior hollow space occupied by said conductor strip when received therein with said outwardly angled free and portions engaged in said first recesses, said second recesses being aligned in a transverse plane of said interior hollow space, and a supplementary conductor member having mutually opposite edge portions received in said second recesses.

4. An electric current conductor rail comprising a conductor strip of metallic material, said conductor strip having a cross-section being approximately Z-shaped, said Z-shaped cross-section having transverse limbs at the upper and lower extremities, at least one of the two transverse limbs at the upper and lower extremities of said cross-section having an external surface being inwardly curved, and a downwardly open housing of electrically insulating material defining an interior hollow space of substantially rectangular cross-section receiving said conductor strip, said interior hollow space having a greater cross-sectional height than that of said conductor strip and said housing further defining retaining means for retaining said conductor strip in said interior space, said housing further defining a respective recess arranged at each vertical side of said interior hollow space directly adjacent to the portion of said interior hollow space occupied by said conductor strip, said recesses being aligned in a transverse plane of said interior hollow space.

5. A conductor rail according to claim 4, further comprising a supplementary conductor member having mutually opposite edge portions thereof engaged in said recesses.

6. An electric current conductor rail comprising a conductor strip of metallic material, said conductor strip having a cross-section being approximately Z-shaped, said Z-shaped cross-section having transverse limbs at the upper and lower extremities, at least one of the two transverse limbs at the upper and lower extremities of said cross-section having an external surface being inwardly curved, and a downwardly open housing of electrically insulating material defining an interior hollow space of substantially rectangular cross-section receiving said conductor strip, said interior hollow space having a greater cross-sectional height than that of said conductor strip and said housing further defining retaining means for retaining said conductor strip in said interior space, said conductor strip further comprising a respective web portion adjoining each end of each of said limbs, each of said web portions extending at a right angle to the associated one of said limbs and in direction toward the other one of said limbs, said conductor strip comprising a connecting web having two end portions, two diagonally opposite ones of said web portions being connected together by a connecting web, said two end portions being offset relative to each other and each of said end portions being connected at right angles to a respective one of said two web portions, and an intermediate portion connecting said end portions together, and a pair of connecting elements of metallic material each so engaged in said conductor strip as to be received in a space bounded in part by a respective one of said transverse limbs thereof, the associated ones of said web portions and the associated ones of said end portions of said connecting web, said connecting elements projecting from said conductor strip for corresponding engagement in a further such conductor strip thereby to electrically interconnect the strips, and clamping means being provided to cause said connecting elements to be clamped in place.

7. A conductor rail according to claim 6, wherein each of the other two diagonally opposite ones of said web portions comprises a free end portion angled to extend outwardly away from the rest of the strip.

8. A conductor rail according to claim 7, wherein said retaining means defined by said housing comprise a respective support rib protruding into said interior hollow space from each vertical side thereof to engage between the respectively adjacent ones of said web portions of said conductor strip, and a respective recess adjoining each of said support ribs and receiving the respectively adjacent one of said outwardly angled free end portions of said conductor strip web portions.

* * * * *